US006815602B2

(12) United States Patent
De Franco

(10) Patent No.: US 6,815,602 B2
(45) Date of Patent: Nov. 9, 2004

(54) ELECTRONIC PERCUSSION INSTRUMENT WITH IMPACT POSITION-DEPENDENT VARIABLE RESISTIVE SWITCH

(76) Inventor: Vince De Franco, 1985 Sunset Plaza Dr., Los Angeles, CA (US) 90069

( * ) Notice: Subject to any disclaimer, the term of this patent is extended or adjusted under 35 U.S.C. 154(b) by 0 days.

(21) Appl. No.: 10/262,103

(22) Filed: Sep. 30, 2002

(65) Prior Publication Data

US 2004/0060427 A1 Apr. 1, 2004

(51) Int. Cl.[7] .................................................. G01H 3/14
(52) U.S. Cl. ......................................................... 84/730
(58) Field of Search ................................ 84/723, 730.7, 84/43

(56) References Cited

U.S. PATENT DOCUMENTS

| | | | | | |
|---|---|---|---|---|---|
| 4,852,443 | A | * | 8/1989 | Duncan et al. | 84/733 |
| 5,920,026 | A | * | 7/1999 | Yoshino et al. | 84/738 |
| 6,150,600 | A | * | 11/2000 | Buchla | 84/688 |
| 6,601,436 | B1 | * | 8/2003 | Senda et al. | 73/12.09 |

* cited by examiner

*Primary Examiner*—Jeffrey W Donels
(74) *Attorney, Agent, or Firm*—Kirschstein, et al.

(57) ABSTRACT

Surface impact position and/or intensity of an impact on a drum are detected and used to generate different sounds, lights and other special effects.

18 Claims, 6 Drawing Sheets

ELECTRONIC PERCUSSION INSTRUMENT WITH IMPACT POSITION-DEPENDENT VARIABLE RESISTIVE SWITCH

BACKGROUND OF THE INVENTION

1. Field of the Invention

The present invention generally relates to electronic percussion arrangements and, more particularly, to musical instruments such as drums for generating different sounds depending upon the position and/or the velocity of impact thereon.

2. Description of the Related Art

It is known to provide electronic percussion instruments, such as electronic drums and electronic cymbals, by striking one or more pads to generate vibrations which are then converted to electrical signals and processed in an audio synthesizer to produce audio signals which are supplied to speakers or headphones from which audible sounds are heard.

It is also known to provide some amount of control over the audible sounds. Volume and tone are controlled, typically by manually operating a slider, knob or wheel. Sensors are also provided to detect the force of impact. However, the amount of control over the audible sounds is still limited, and more sonic realism comparable to that produced by traditional musical instruments, as well as special sound and light effects, are desired.

SUMMARY OF THE INVENTION

OBJECTS OF THE INVENTION

One object of this invention is to provide an electronic percussion instrument which allows a musician more control over the sounds produced.

Another object of this invention is to enable different sounds, lights and other special effects to be produced depending on the position of impact on a percussion instrument.

Yet another object of this invention is to provide an instrument which is easy to play and which provides a rich musical experience.

FEATURES OF THE INVENTION

In keeping with these objects and others which will become apparent hereinafter, one feature of this invention resides, briefly stated, in an electronic percussion arrangement, particularly a musical instrument, including a frame, an impact element supported by the frame and having an impact surface to be struck during use, a surface impact position sensor or generator for generating surface impact position electrical signals indicative of respective positions at which the impact surface was struck, and an output generator for generating outputs, such as sounds, lights and other special effects, respectively corresponding to the surface impact position signals.

In accordance with this feature of the invention, the surface impact position sensor can be used to trigger and control a multitude of outputs from a corresponding multitude of possible position points or coordinates on the impact element. The position sensor is operable independently, and preferably simultaneously, with an impact intensity sensor or generator for generating impact intensity electrical signals indicative of respective velocities at which the impact element was struck. The number of possible position points and velocities (pressures) is proportional to a bit resolution of the output generator and offers a great deal of control over the sounds and/or effects produced, thereby providing great sonic realism.

The position sensor, in a preferred embodiment, is a variable resistive switch that comprises a pair of juxtaposed membranes having electrically conductive tracks in a mirror symmetrical relationship with each other. The tracks have a predetermined resistance per unit length and are maintained apart in an open state by a plurality of electrically insulating ball-shaped masses between the membranes. When one of the membranes is impacted and moved toward the other, electrical contact between the tracks is made in a closed state at a contact location, thereby determining a total resistance for the switch. Each contact location determines a different resistance, which is used to control the output from the output generator.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
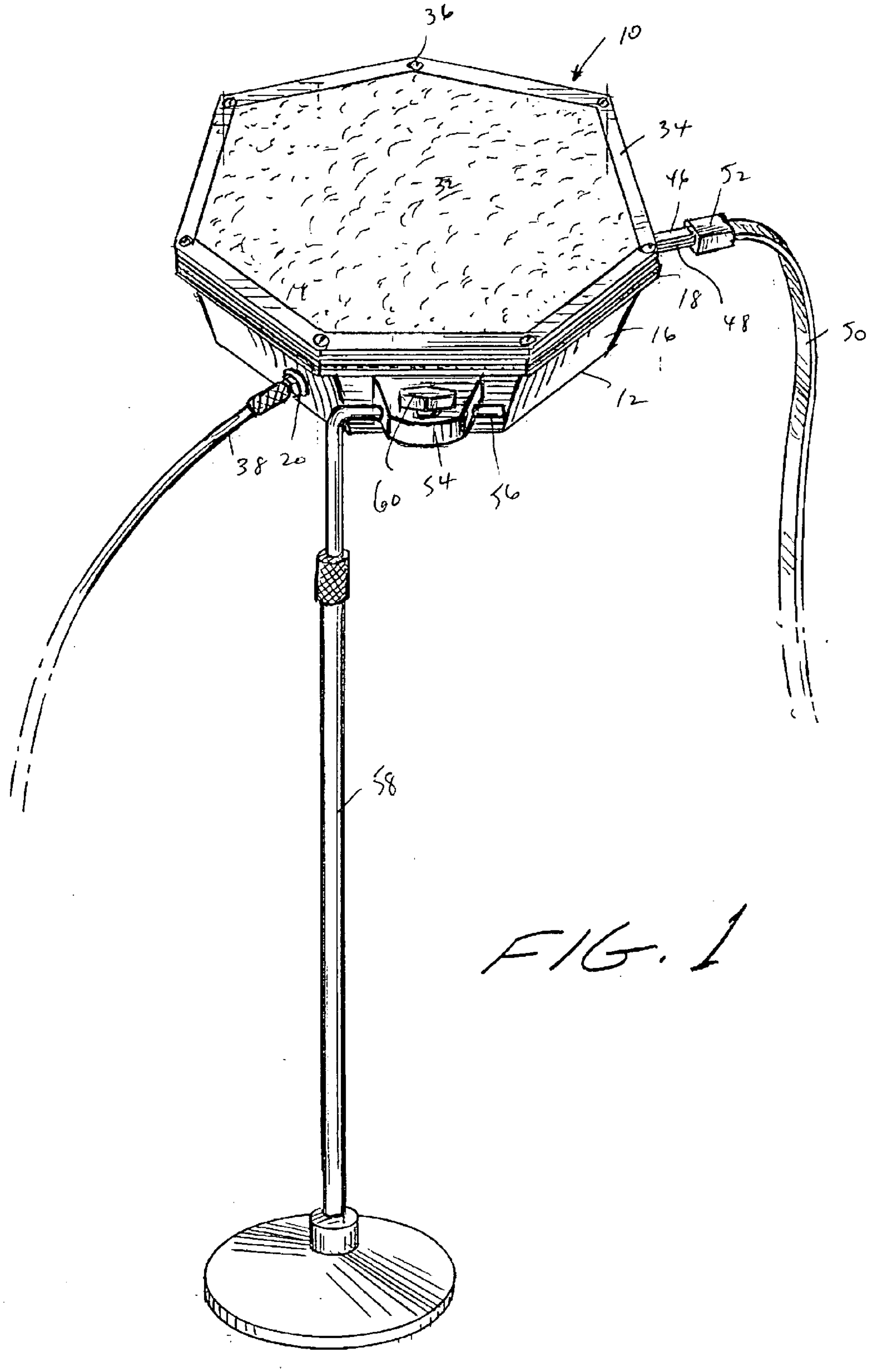
FIG. 1 is a perspective view of an electronic percussion instrument according to this invention.
Figure 2:
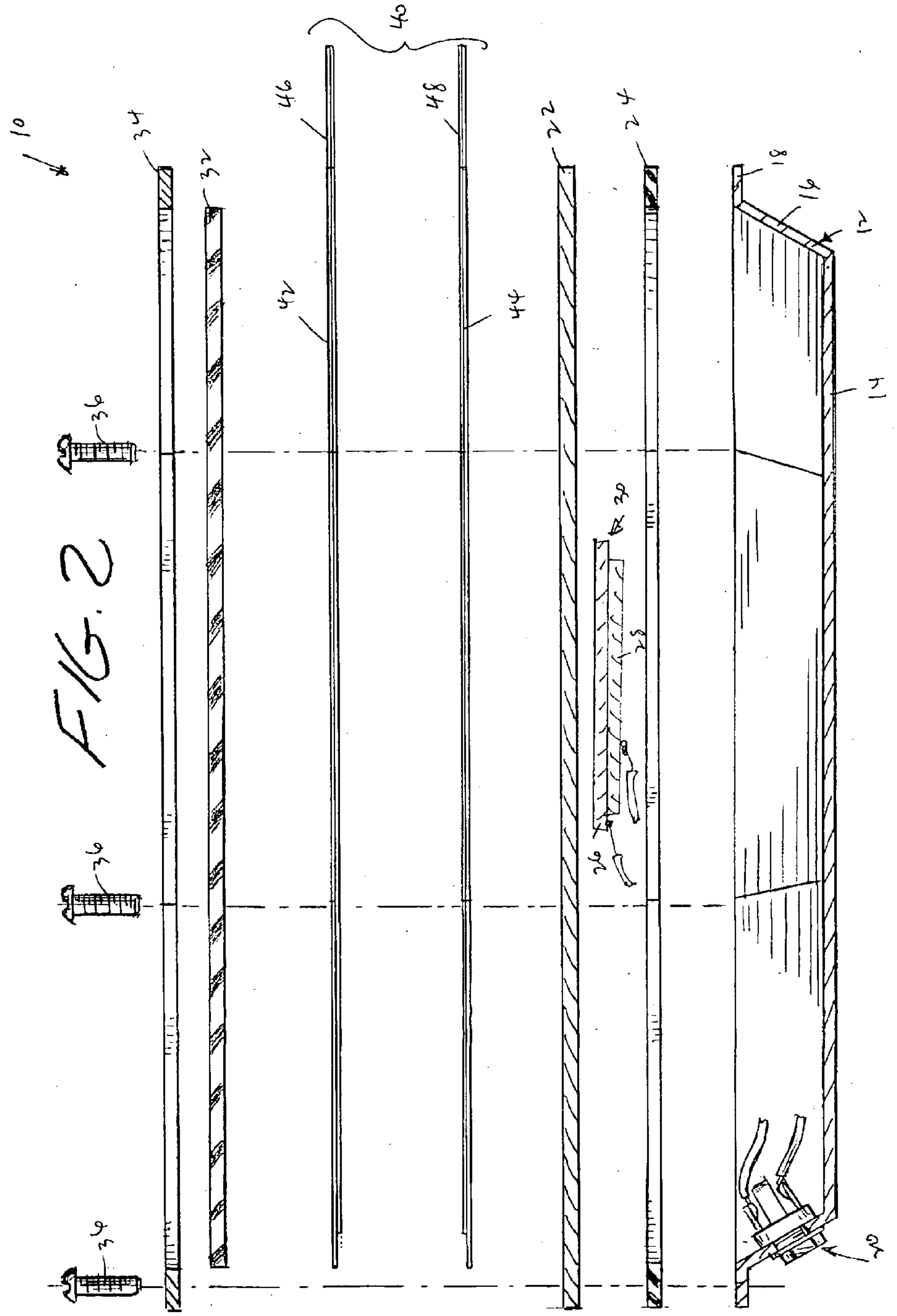
FIG. 2 is an exploded view of the instrument of FIG. 1.

Reference numeral 10 generally identifies an electronic percussion instrument, for example, a drum comprising, as best seen in FIGS. 1–2, a dish-shaped drum body or frame 12 having a base 14, an annular side wall 16, and an upper flange 18. The frame is preferably made of a metallic material and may have any shape such as a septagon, as illustrated. An electrical feedthrough connector 20 for receiving a phonoplug is mounted on the side wall.

A planar drum plate 22, also made of a metallic material, overlies an open side of the frame 12. A rubber sealing gasket 24 is mounted between the plate 22 and the flange 18. A piezoelectric sensor 30 is adhered to the underside of the plate 22 and includes two strain plates 26, 28 connected to wires at the connector 20. The sensor 30 generates, as described below, surface impact intensity or velocity electrical signals indicative of impact pressure.

A variable resistive switch 40 comprised of two flexible films or membranes 42, 44 overlying and adhering to each other is, in turn, adhered to an upper side of the plate 22. As described below, the switch 40 serves as a surface impact position sensor for generating surface impact position electrical signals indicative of impact position. Upper and lower membranes 42, 44 have output leads 46, 48 extending radially exteriorly of the frame.

An impact element 32, preferably constituted of a force-transmitting material, such as rubber, is planar and overlies the upper membrane 42. The impact element is laid flat on the frame and has an impact surface which is in surface area contact with the upper membrane 42. A mounting ring 34 overlies the impact element and, with the aid of mounting screws 36, securely holds all the components to the frame by being threaded into the flange 18.

As seen in FIG. 1, the assembled drum 10 has the impact element 32 exposed over a wide area. The element 32 is adapted to be struck anywhere within the exposed area, and is in a force-transmitting relationship with the switch 40, the plate 22 and the piezoelectric sensor 30. A cable 38 is plugged into the connector 20 to enable the electrical signals generated by sensor 30 to be conducted away from the drum for processing, as described below. Also, another cable 50 is connected at connector 52 to the output leads 46, 48 for conducting electrical signals generated by the switch 40 away from the drum for processing, as also described below. A mounting projection 54 extends away from the side wall 16 of the frame and has a bore through which a rod 56 of a music stand 58 is insertable and held in place by a lock 60. The stand 58 is adjustable for various elevations above the floor to accommodate a musician who is striking the drum, either directly by hand, or with the aid of drumsticks.

Figure 4:
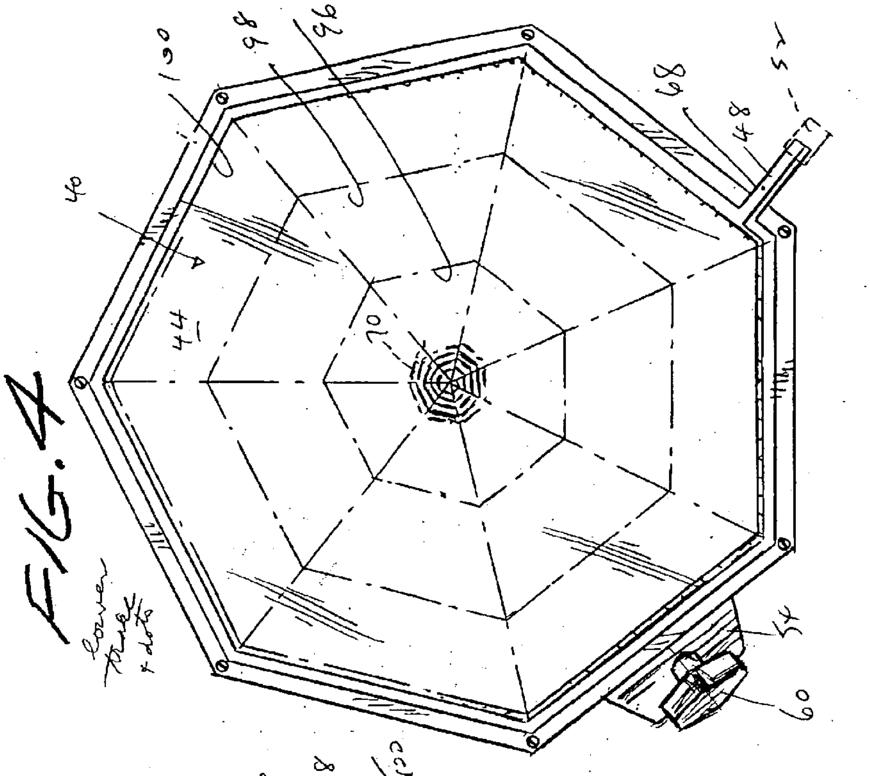
FIG. 4 is a bottom plan view analogous to FIG. 3, but showing a lower side of the switch.
Figure 3:
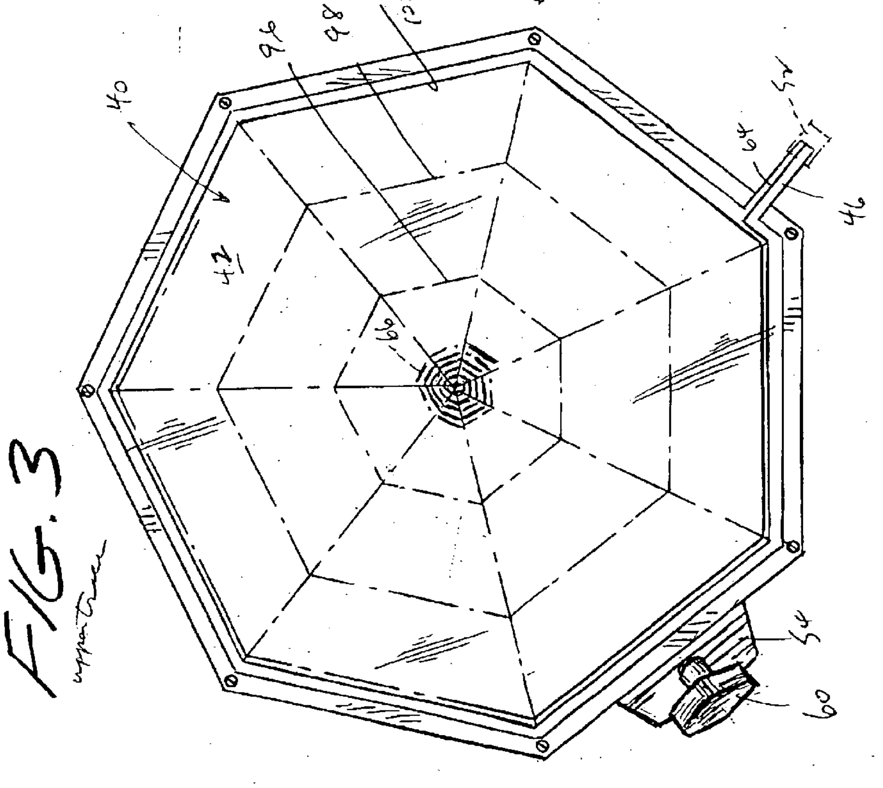
FIG. 3 is a top plan view of the instrument of FIG. 1, but with upper components removed to show an upper side of a variable resistive switch therein.
Figure 5:
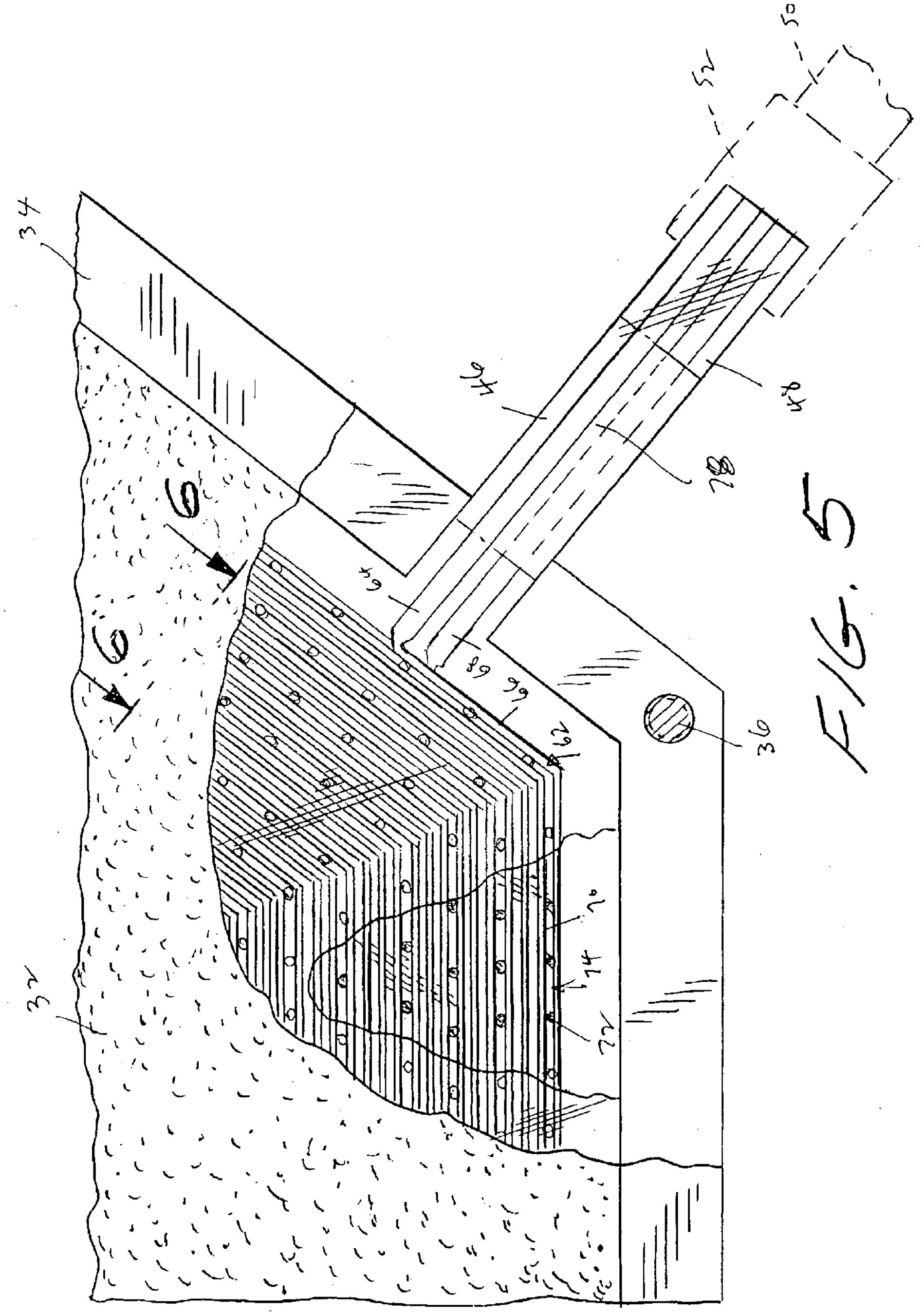
FIG. 5 is a broken-away corner detail of the switch of FIGS. 3–4.

The upper membrane 42 of the switch 40 is shown in FIG. 3, and the lower membrane 44 is shown in FIG. 4. Upper membrane 42, as best seen in FIG. 5, has an electrically conductive track 62 screen printed thereon. Track 62 has a linear output section 64 extending lengthwise of the output lead 46, and a spiral section 66 extending clockwise into the center. Lower membrane 44, also best seen in FIG. 5, has an electrically conductive track 74 screen printed thereon. Track 74 has a linear output section 68 extending lengthwise of the output lead 48, and a spiral section 70 extending counter-clockwise into the center. Linear sections 64, 68 are parallel to each other. Spiral sections 66, 70 are mirror symmetrical.

Figure 6:
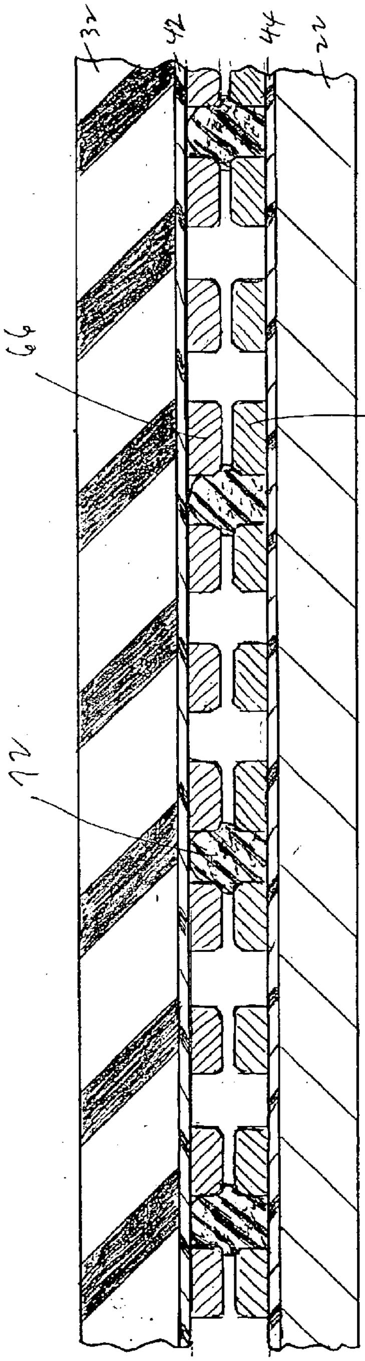
FIG. 6 is an enlarged sectional view taken on line 6—6 of FIG. 5, and showing the switch in an open state.
Figure 7:
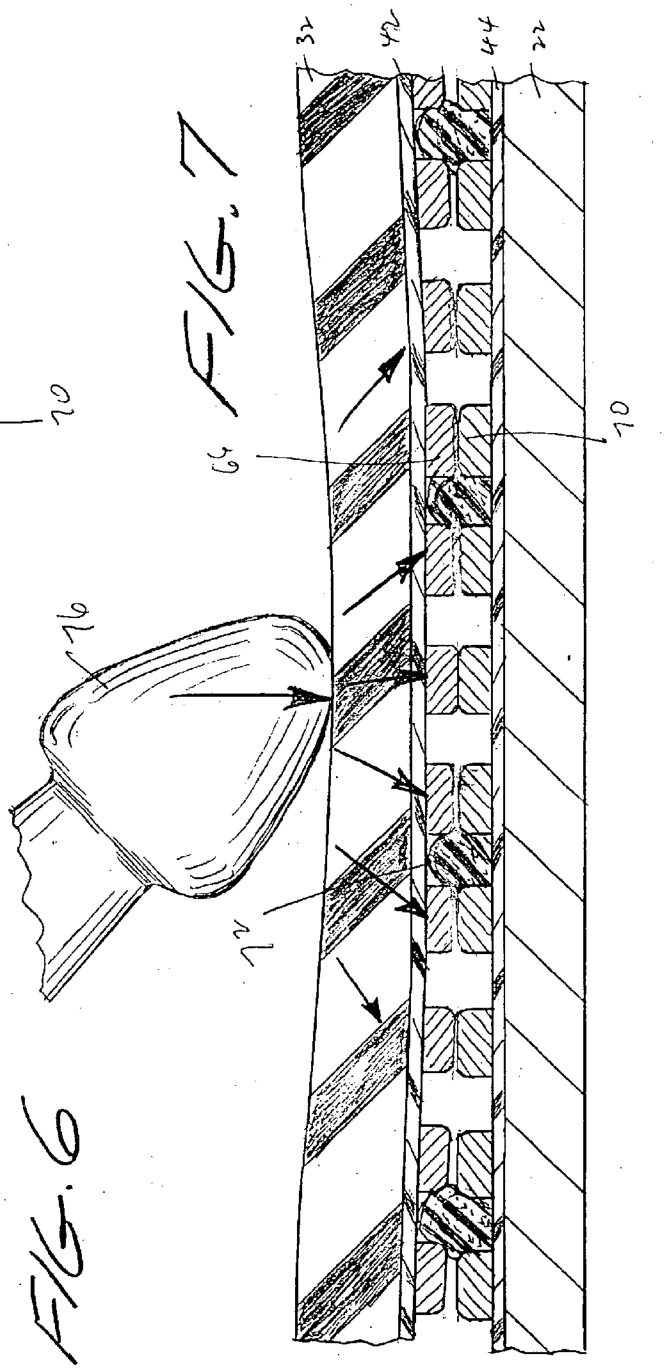
FIG. 7 is a view analogous to FIG. 6, but showing the switch in a closed state.

A plurality of electrically insulating spherical masses or dots 72 is screen printed on the lower membrane and maintains the conductive spiral sections 66, 70 of the membranes 42, 44 normally apart from each other in an open state, as seen in FIG. 6. When pressure is applied to the upper membrane 42 via the impact element 32, as depicted by the drumstick 76 in FIG. 7, a portion of the track of the upper membrane makes electrical contact with a portion of the track of the lower membrane in a closed state. The membrane 42 has sufficient flexibility to allow this motion. The dots 72 neighboring the point of contact between the tracks may slightly deform to allow this motion. It is preferred to use the dielectric sold by Acheson Colloids Company of Port Huron, Mich. as Electrodag® 1015 for screen printing the dots.

In the closed state, an electrical path is made from the upper linear section 64 along the upper spiral section 66 to the point of contact, and then along the lower spiral section 70 to the lower linear section 48. The linear sections 46, 48 are kept apart at all times by a dielectric spacer 78. Each track is a conductive ink having a fixed resistance per unit length. It is preferred to use for each track the ink sold by Acheson Colloids Company of Port Huron, Mich. as Electrodag® 725A-65-54 which has a rated resistance of <15 milliohms per square mil.

Hence, depending on where the point of impact of the drumstick 76 is on the impact element 32, a different contact point is obtained between the spiral track sections 66, 70. This, in turn, determines the total length of the resistive path and, of course, the total resistance present in the switch 40 between the output line sections 64, 68. Each contact point has a unique resistance associated therewith, and this is used to trigger a unique event or a unique sound in the arrangement of FIG. 8.

Figure 8:
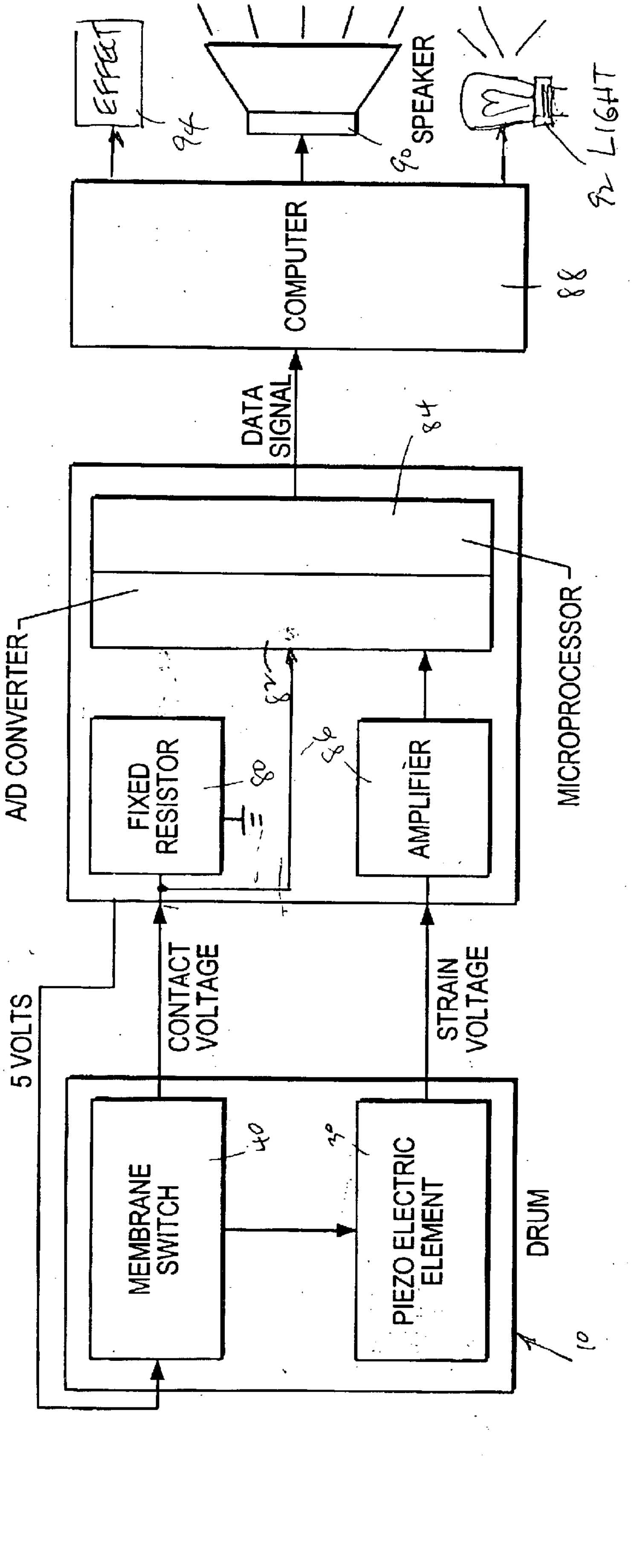
FIG. 8 is an electrical schematic block diagram of the instrument of FIG. 1 as used in an arrangement for producing sound and/or special effects.

Thus, the switch 40, identified as a membrane switch in FIG. 8, detects surface impact positions on the impact element, and generates corresponding analog position signals identified as a contact voltage in FIG. 8. The sensor 30, identified as a piezoelectric element in FIG. 8 detects surface impact intensities on the impact element, and generates corresponding analog intensity signals identified as a strain voltage in FIG. 8.

The arrangement includes a fixed resistor 80 which, together with the membrane switch 40 (potentiometer), are used as components in a voltage divider. When a dc voltage (5V) is applied to the linear section 64 of the upper spiral track, a current travels through the point of contact to the linear section 68 of the lower spiral track, and finally through the fixed resistor to ground. The voltage drop across the fixed resistor 80 is converted to a digital position signal by an analog to digital converter 82 and is processed in a microprocessor 84 to generate a digital position number which is proportional to the impact position.

The analog strain voltage of the piezoelectric element 30 is amplified in an amplifier 86, converted into a digital signal by the converter 82, and processed in the microprocessor 84 to generate a digital intensity number which is proportional to impact intensity.

The position and intensity numbers gathered by the microprocessor can be separately or jointly processed to create a data signal for transmission to a sampler, synthesizer, or computer 88 for operating a speaker 90, a light 92, or other special effect output device 94. In the case of a speaker, the position and intensity numbers can be used to trigger a specific sound or musical tone and to specify how loudly that sound is to be played. Preferably, the microprocessor 84 translates the digital numbers into MIDI data which is then used to trigger and control any number of sonic and tonal qualities of a synthesized sound.

The number of possible position points and impact velocities is proportional to the bit resolution of the converter 82. Over one million distinct two-dimensional points are able to be detected and output by the microprocessor 84. For a more practical and playable instrument, the resolution of the converter or the code of the microprocessor can be adjusted to divide the exposed impact surface of the impact element 32 into three concentric strike zones, as diagrammatically set forth in FIGS. 3–4, by zones 96, 98, 100. The three zones can be used to trigger three separate sounds, each having an output volume range of, for example, 128 steps. Zone 96 can be configured for snare drums; zone 98 can be configured for a bass drum; and zone 100 can be configured as a conventional drum. Of course, different zones can be configured to control lighting, or other special effects. The zones can further be subdivided into subzones for even more control options.

It will be understood that each of the elements described above, or two or more together, also may find a useful application in other types of constructions differing from the types described above.

While the invention has been illustrated and described as embodied in an electronic percussion instrument with impact position-dependent variable resistive switch, it is not intended to be limited to the details shown, since various modifications and structural changes may be made without departing in any way from the spirit of the present invention.

For example, the conductive tracks need not be shaped as spirals. It is sufficient if the tracks extend over the surface area and, hence, can have a myriad of different shapes. Also, the output leads 46,48 can be routed through the cable 38 for a more compact arrangement.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An electronic percussion instrument, comprising:

a) a frame;

b) an impact element supported by the frame and having an impact surface to be struck anywhere over the entire impact surface during use of the instrument;

c) a surface impact position generator having a single sensor in a force-transmitting relationship with the impact element, for generating surface impact position electrical signals indicative of respective positions over the entire impact surface at which the impact surface was struck, the sensor having a variable parameter that varies as a function of position over the entire impact surface; and d) an output generator for generating sounds respectively corresponding to the surface impact position signals.

2. The instrument of claim 1, wherein the impact element is laid flat on, and overlies, the frame.

3. The instrument of claim 1, wherein the position generator is generally planar, and wherein the impact element lies in a plane and is in area contact with the position generator.

4. The instrument of claim 1, wherein the sounds are different for the respective surface impact position signals.

5. The instrument of claim 1; and further comprising an impact intensity generator for generating impact intensity electrical signals indicative of respective velocities at which the impact surface was struck, and wherein the output generator is operative for generating the sounds respectively also corresponding to the impact intensity signals.

6. The instrument of claim 5; and further comprising an impact member supported by the frame and in a force-transmitting relationship with the impact element, and wherein the impact intensity generator is a piezoelectric device mounted on the impact member.

7. The instrument of claim 5, wherein the output generator includes a converter for converting the surface impact position signals and the impact intensity signals into digital signals, and a processor for processing the digital signals into the sounds.

8. The instrument of claim 7, wherein the impact element has a plurality of strike zones, and wherein the sounds are different for each strike zone.

9. A variable resistive switch, comprising:

a) a pair of juxtaposed membranes having electrically conductive tracks in mirror symmetrical relationship with each other, b) a plurality of electrically insulating masses between the membranes and maintaining the tracks apart in an open state, c) at least one of the membranes being movable toward the other in a closed state to make electrical contact therewith at a contact location corresponding to a position at which said at least one membrane is impacted, and d) the tracks having a resistance per unit length, and having a total length and a total resistance dependent upon the contact location.

10. The switch of claim 9, wherein each track has a spiral pattern.

11. An electronic percussion arrangement, comprising:

a) a frame;

b) an impact element supported by the frame and having an impact surface to be struck anywhere over the entire impact surface during use of the arrangement;

c) a surface impact position generator having a single sensor in a force-transmitting relationship with the impact element, for generating surface impact position electrical signals indicative of respective positions over the entire impact surface at which the impact surface was struck, the sensor having a variable parameter that varies as a function of position over the entire impact surface; and d) an output generator for generating outputs respectively corresponding to the surface impact position signals.

12. The arrangement of claim 11; and further comprising an impact intensity generator for generating impact intensity electrical signals indicative of respective velocities at which the impact surface was struck, and wherein the output generator is operative for generating the outputs respectively also corresponding to the impact intensity signals.

13. The arrangement of claim 12; and further comprising an impact member supported by the frame and in a force-transmitting relationship with the impact element, and wherein the impact intensity generator is a piezoelectric device mounted on the impact member.

14. The arrangement of claim 13, wherein the output generator includes a converter for converting the surface impact position signals and the impact intensity signals into digital signals, and a processor for processing the digital signals into the outputs.

15. The arrangement of claim 14, wherein the impact element has a plurality of strike zones, and wherein the outputs are different for each strike zone.

16. An electronic percussion instrument, comprising:

a) a frame;

b) an impact element supported by the frame and having an impact surface to be struck during use of the instrument;

c) a surface impact position generator in a force-transmitting relationship with the impact element, for generating surface impact position electrical signals indicative of respective positions at which the impact surface was struck, the position generator including a resistor having a variable resistance that varies as a function of the positions at which the impact surface was struck; and d) an output generator for generating sounds respectively corresponding to the surface impact position signals.

17. The instrument of claim 16, wherein the position generator includes a first membrane having a first conductive track, a second membrane juxtaposed with the first membrane and having a second conductive track which is mirror symmetrical to the first track, and an electrical insulator for normally maintaining the tracks apart in an open state when the impact surface is not struck; and wherein the tracks make mutual electrical contact in a closed state when the impact surface is struck.

18. The instrument of claim 17, wherein each track is arranged in a spiral pattern on the respective membranes, and wherein the insulator is a plurality of raised dielectric masses between the membranes.

* * * * *